(12) United States Patent
Lukas et al.

(10) Patent No.: US 7,909,559 B2
(45) Date of Patent: Mar. 22, 2011

(54) SYSTEM FOR FEEDING STORING UNITS

(75) Inventors: Gunther Lukas, Parkstein (DE); Arnold Krusche, Wetzlar (DE); Anton Hafeneder, Bruckberg (DE)

(73) Assignee: Westfalia Intralogistic GmbH, Harsewinkel (DE)

( * ) Notice: Subject to any disclaimer, the term of this patent is extended or adjusted under 35 U.S.C. 154(b) by 154 days.

(21) Appl. No.: 10/494,417

(22) PCT Filed: Nov. 7, 2002

(86) PCT No.: PCT/EP02/12451
§ 371 (c)(1),
(2), (4) Date: Oct. 15, 2004

(87) PCT Pub. No.: WO03/040017
PCT Pub. Date: May 15, 2003

(65) Prior Publication Data
US 2005/0065636 A1    Mar. 24, 2005

(30) Foreign Application Priority Data
Nov. 8, 2001 (DE) ................ 101 54 787

(51) Int. Cl.
*B65G 1/06* (2006.01)
(52) U.S. Cl. .................. 414/282; 414/277; 414/286
(58) Field of Classification Search ............ 414/277, 414/279, 281–282, 286, 591, 401–402; 212/273
See application file for complete search history.

(56) References Cited

U.S. PATENT DOCUMENTS

| 3,351,219 A | 11/1967 | Ruderfer |
| 3,596,789 A | 8/1971 | Aaronson et al. |
| 4,003,296 A | 1/1977 | Wentz |
| 4,010,856 A | 3/1977 | Anderson |
| 5,207,555 A | 5/1993 | Shirai |
| 5,564,880 A | 10/1996 | Lederer |

FOREIGN PATENT DOCUMENTS

| CH | 678 310 A | 8/1991 |
| CN | 1589234 | 3/2005 |
| DE | 1756427 | 4/1970 |
| DE | 2316630 | 10/1973 |
| DE | 24 49 805 A | 4/1975 |

(Continued)

OTHER PUBLICATIONS

German Office Action Communication dated Apr. 3, 2006.

(Continued)

*Primary Examiner* — James Keenan
(74) *Attorney, Agent, or Firm* — Banner & Witcoff, Ltd

(57) ABSTRACT

The invention relates to a system for operating storage units. The inventive system enables quick storage and removal therefrom and exhibits an optimum redundancy capacity. In order to counteract shortfalls in individual shelf operation devices, the inventive load receiving means acts as a support for a system for operating storage units, especially high shelf storage units, comprising means for mechanical connection to shelf unit, a lift device and a device arranged thereon for the transversal movement of loads, whereby the means for connection to a shelf unit has an electric drive unit with a pinion gear, driving a toothed rack and the toothed rack is arranged and embodied in such a way that when the pinion gear is rotated said toothed rack moves laterally outside the load receiving means, and the toothed racks are respectively provided with means which protrude from the ends thereof above the load receiving means, engaging into corresponding receiving devices on the shelf units.

14 Claims, 12 Drawing Sheets

FOREIGN PATENT DOCUMENTS

| | | |
|---|---|---|
| DE | 25 53 221 A | 6/1977 |
| DE | 3026798 | 2/1981 |
| DE | 31 06 137 A | 9/1982 |
| DE | 3213983 | 10/1983 |
| DE | 36 13 079 A | 10/1987 |
| DE | 42 05 856 A | 10/1992 |
| DE | 42 10 175 A | 9/1993 |
| DE | 4414772 | 11/1995 |
| DE | 29718342 | 4/1998 |
| DE | 199 07 989 A1 | 10/1999 |
| DE | 19920923 | 11/2000 |
| EP | 0 457 713 | 11/1991 |
| GB | 1070176 | 6/1967 |
| GB | 1132263 | 10/1968 |
| GB | 1 242 155 A | 8/1971 |
| GB | 1251446 | 10/1971 |
| JP | 61217407 | 9/1986 |
| WO | WO 97 47554 A | 12/1997 |

OTHER PUBLICATIONS

English Translation of German Office Action Communication dated Aug. 18, 2006.
English Abstract of German Patent DE 199 07 989 (See, English Translation of German Office Action Communication dated Aug. 18, 2006).
International Search Report, PCT/EP02/12451, Mar. 14, 2003.
International Search Report, PCT/EP02/12452, Jun. 3, 2003.
International Search Report, PCT/EP02/12453, Jun. 3, 2003.
International Search Report, PCT/EP02/12454, Mar. 14, 2003.
DE-Z: F & H Fordern und Heben 45 (1995) Nr. 10, S 726/727.

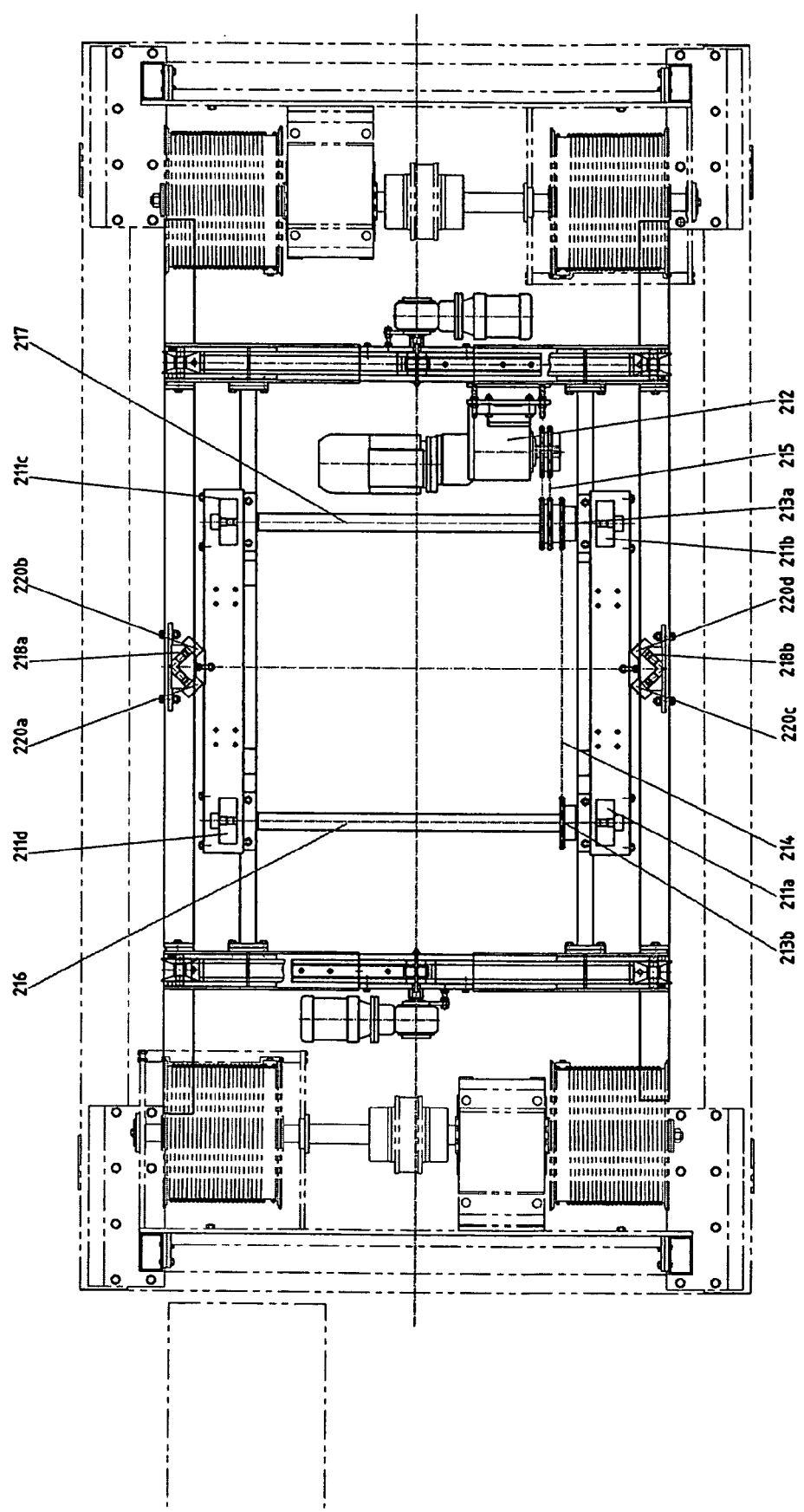

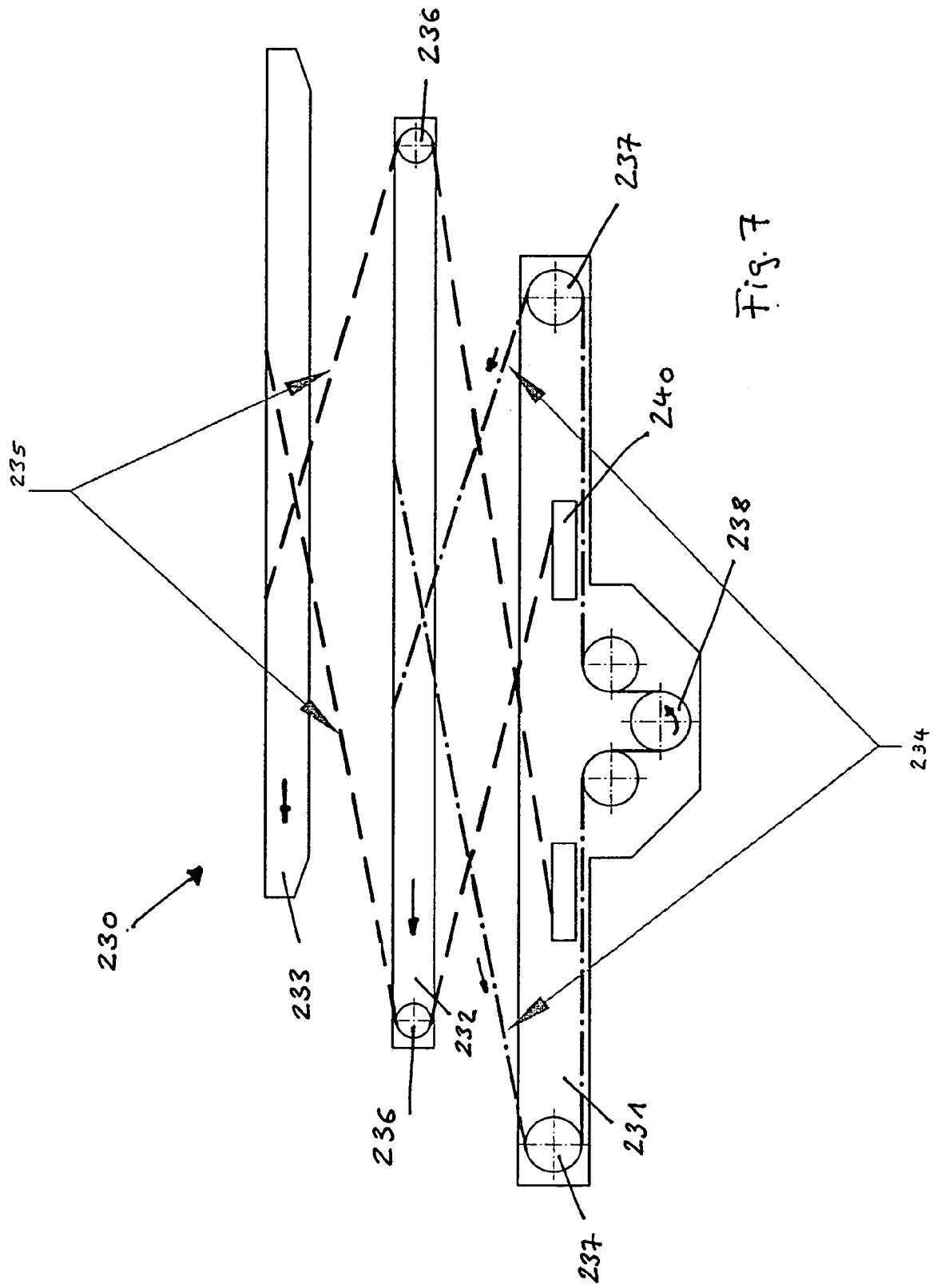

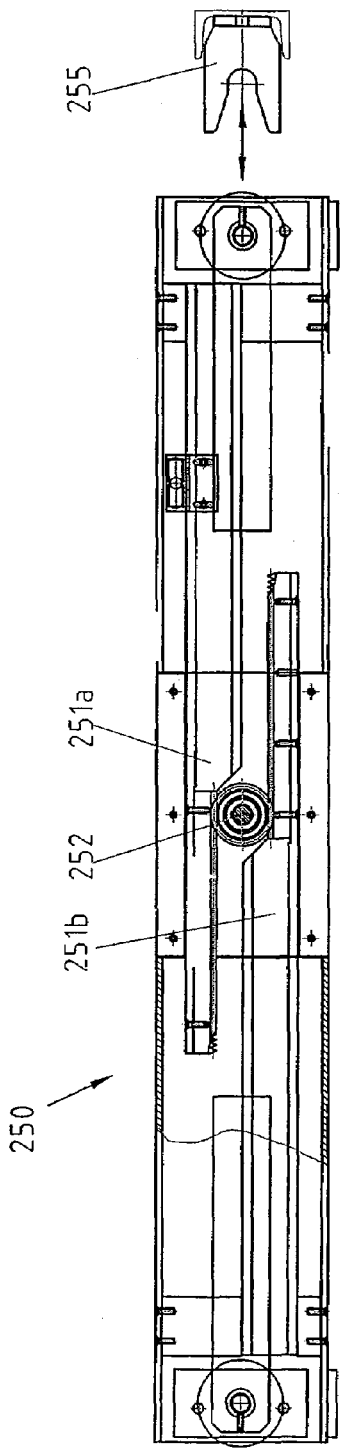
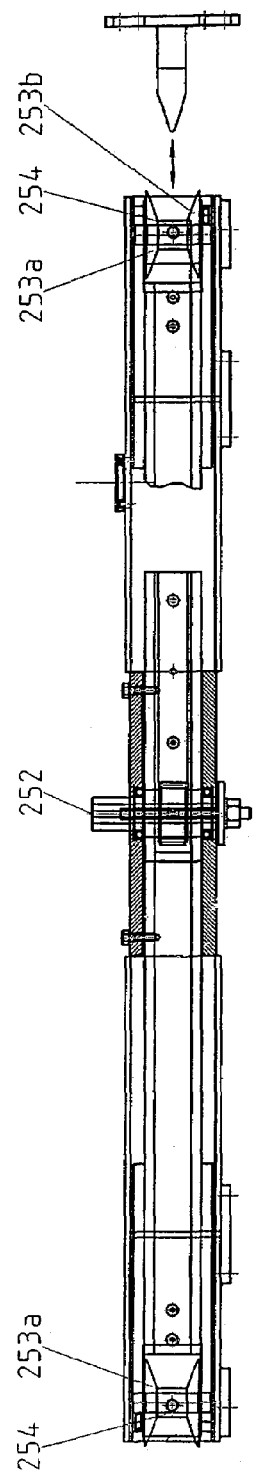
Fig. 8b
Fig. 8a

SYSTEM FOR FEEDING STORING UNITS

This application is a National Stage application of co-pending PCT applications PCT/EP02/12451 filed Nov. 7, 2002; PCT/EP02/12452, filed Nov. 7, 2002; PCT/EP02/12453, filed Nov. 7, 2002 and PCT/EP02/12454, filed Nov. 7, 2002, and which also claims priority of German Patent Application No. 101 54 787.0, filed Nov. 8, 2001. These applications are incorporated herein by reference in their entirety.

FIELD AND BACKROUND OF THE INVENTION

The subject matter of the present invention is a system for feeding storing units, in particular high rack units, by the assistance of a rack feeding device that always provides appropriate ground clearance beneath a load receiving means.

For realizing rationalization effects in storage logistics, efforts have been undertaken to comprise individual storing units in space and to thus increase storage capacities. In order to be, nevertheless, capable of achieving favorable access times, i.e. storing and transferring times, it is necessary to provide, in addition to the designing of appropriate rack units, systems and concepts that enable the storing and transfer of goods of varying dimensions, varying weight and distribution of gravity in a target and time-orientated manner, and to provide appropriate redundancy capacities to safeguard against a possible failure of these rack feeding devices.

SUMMARY OF THE INVENTION

It is therefore an object of the present invention to provide a system for feeding storing units which, on the one hand, is capable of achieving short storing and transferring times and, on the other hand, comprises an optimum redundancy capacity to encounter a failure of individual rack feeding devices as good as ever possible.

This object is solved by the system for feeding storing units, in particular high rack stores, in accordance with the invention, consisting of a plurality of rack units that are designed and arranged in a room such that at least one equidistant alley is formed, further consisting of at least one rack feeding device that consists of a traversing means movable on rails in longitudinal direction of the alleys; a control unit for controlling the movement of the traversing means; means for determining the position of the traversing means in the alley; a load receiving means in accordance with the invention hanging on cables beneath the traversing means; means for determining the position of the load receiving means vis-à-vis the traversing means; means for mechanically connecting the load receiving means with a rack unit.

Advantageous further developments of the present invention are characterized in the subclaims.

The system for feeding storing units in accordance with the invention substantially consists of individual rack feeding devices with two dynamic components each, the traversing means and the load receiving means, as well as a static component, the rack store consisting of individual rack store units of any length and extension.

The two dynamic components are connected with one another via dimensionally instable connecting elements, for instance steel cables, chains, or the like.

As statically fixed component of the system according to the invention, a plurality of rack units, preferably high rack store units, are provided which are separated from one another by equidistant alleys and can be arranged in rooms of almost any size.

Functioning Principle of the System According to the Invention

By means of the system according to the invention, any goods can be efficiently stored in and transferred from a store and, due to the possibility of arranging a plurality of rack feeding devices in one rack alley and of also operating them simultaneously, short access time and thus high efficiency is achieved.

After the building up of the high rack units, with both the number of storing units positioned on top of each other and the length of the storing units and the number of the respective alleys being optional, the rack feeding devices are arranged in the appropriate alleys.

Due to the existing ground clearance beneath each traversing means and load receiving means it is possible to provide a traversing means with load receiving means arranged thereon at every single level.

In a high rack store that comprises, for instance, 5 rack units and 6 rack levels, it is, for instance, possible to arrange a maximum of 6 rack feeding devices each in the 4 equidistant alleys and, in the case of need, to operate all 6 rack feeding devices in correspondence with a control program, so that a total of 24 rack feeding devices is available.

In accordance with the invention, the storing of loads of any design, i.e. loads of varying sizes, varying weight and varying dimensions, is performed as follows:

1. Receiving of the load by means of a lifting device that is integrated in the load receiving means, wherein a shifting means allowing a transversal movement of the load is positioned at the lifting device;
2. "Centering" of the load on the load receiving means;
3. Simultaneously/subsequently to "2."—Calculating of a traversing path starting out from the instant position to the target place;
4. Starting to move the traversing means in the direction of the target place;
5. Controlling of the course of motions of the traversing means and of the load receiving means;
6. Arrival at the target place (e.g. target rack unit), wherein both the traversing means and the load receiving means have completely terminated their course of motions;
7. Locking of the load receiving means on the level of the target rack unit by per-forming a positive or frictional connection with the adjacent rack units;
8. Rising of the load by means of the lifting device;
9. Transversal movement of the load by means of integrated shifting means;
10. Placing of the load in the appropriate target rack unit;
11. Lowering of the lifting device and reversion of the transversal movement;
12. Releasing of the anchoring in the rack unit;
13. Optional signal of readiness for the next storing/transferring order.

In accordance with the invention, all rack feeding devices positioned in an alley are coordinated via an appropriate control means, i.e. a control system knows, due to appropriate sensor units, the respective state of movement and place of each rack feeding device at any time and is thus capable of preventing a collision of rack feeding devices that are moving simultaneously in an alley. To this end, each rack feeding device possesses control electronics that determine the state of movement or rest via appropriate sensors or measuring means and transmits same to a central control unit.

For determining the respective state of movement, a rack feeding device comprises a control unit that is preferably positioned in the traversing means and controls or regulates both the drive of the traversing means and the drive of the cable coils.

Furthermore, the traversing means comprises means to determine the relative position of the load receiving means hanging on the ropes vis-à-vis the traversing means, wherein the dynamic change of position of the load receiving means is in particular determined on the basis of the movement of the traversing means.

The relative position of the load receiving means is, for instance, possible via a distance measurement between the traversing means and the load receiving means, or via appropriate angle measurements of the two units relative to one another, with the measurements being of the optical, mechanical, or electrical type.

Since the measurement results with respect to the relative position of the load receiving means vis-à-vis the traversing means are implemented in appropriate calculation algorithms so as to avoid undesired oscillation situations of the load receiving means, a correspondingly high precision and quick determination of the measured value is required. A preferred determination of the measured value is, for instance, achieved by means of the goniometry method and appropriate goniometry devices, which are described in DE 101 22 142.8.

Due to the control means that is preferably integrated in the traversing means, it is possible to move each rack feeding device between the starting and the target place such that substantially no pendulum oscillations of the load receiving means arise, but that merely one single amplitude oscillation arises, i.e. the load receiving means, due to its inertia, starts moving later than the traversing means and thus follows the traversing means. On braking of the traversing means the deceleration is controlled such that the load receiving means comes to stop at the target place substantially simultaneously with the traversing means.

Due to the fact that the control system permanently knows the precise position of the traversing means and of the load receiving means hanging thereon, all the relative movements in an alley can be reliably adjusted with respect to one another, so that a collision of individual traversing means with load receiving means can be avoided.

By the arrangement of a plurality of traversing means in one rack alley it is possible to replace failed track feeding devices at least partially in their function, so that accessibility to the loads and goods stored can always be guaranteed.

Only on failure of the uppermost rack feeding device can the goods stored in the uppermost level no longer be accessed. On failure of a rack feeding device thereunder it is, however, always possible to fulfill the tasks from a rack feeding device positioned thereabove, so that even a total failure of several rack feeding devices will not result in a substantial restriction of the availability of the goods stored, unless the uppermost rack feeding device is affected.

First Component Traversing Means

The load receiving means hangs on dimensionally instable connecting elements, for instance steel cables, chains, or the like, on a traversing means. Every single traversing means is rail-bound on a particular level of the storage system according to the invention, which it never leaves.

Only for storing or transferring the loads or for transporting to remote store units may appropriate rails also be positioned outside the rack store units. The following units are integrated in the traversing means:

control unit;
drive unit for the traversing means;
drive unit for the cable coils;
guiding unit for rail guidance In accordance with the invention, a control unit is integrated in every traversing means, and all control units of the traversing means available in one alley are connected with one another via appropriate communication interfaces. The communication of the individual control units may, for instance, be performed wireless via a radio signal, or in an optical manner. The coordination and adjustment of the course of motions of the respective rack feeding devices is advantageously performed by a central control unit. This central control unit may be positioned stationary at a rack unit or else in a mobile manner at a selected traversing means.

In addition to appropriate means for receiving corresponding movement data, each control unit comprises at least one processor with a computer program stored therein, by means of which, on the basis of the position data determined for the traversing means and the load receiving means, the course of motions of these two units to the target place is controlled.

Control Unit

In order to avoid undesired oscillating motions of the load receiving means during movement, various methods may be performed. In the scope of a control loop it is, for instance, possible to compare actual values with corresponding desired values of a course of motions of the load receiving means calculated pursuant to the criteria of optimum control, and to perform a continuous control.

With another method it is possible, starting out from an actual position of the load receiving means, to always calculate a new traversing path and to determine the cable lengths at the cable coils and the deceleration or acceleration of the traversing means accordingly.

To avoid oscillating motions, the system according to the invention may have an influence on at least two setting parameters: the acceleration or deceleration of the traversing means and the modification of the cable length in the front or rear region of the load receiving means.

The program algorithms stored in the control unit modify, according to need (i.e., for instance, taking into account the present state of the system, in particular the position and velocity of the load receiving means, the position of the target place, the position and velocity of the other traversing means in the alley, the present cable lengths, and the cable lengths at the target place), the parameters velocity and acceleration of the traversing means and the cable lengths, where necessary each in the front and rear regions of the load receiving means.

Path Measuring Device for Traversing Means

For determining the respective position of the traversing means, appropriate path measuring systems are provided on the traversing means or in the track unit serving to transport the traversing means, respectively, said path measuring systems enabling to determine the precise position of each traversing means in an alley. These path measuring systems may, for instance, be based on appropriate induction sensors, or may, by means of laser beams that are reflected by a reference plate, determine data that are transmitted to the control unit for further processing. From the data of the position determination or modification, respectively, such obtained, the velocity and acceleration/deceleration and their modification can be calculated by means of appropriate data processing programs, so that the relative state of movement of the traversing means vis-à-vis the rack unit is always known. Other path measuring systems that are based on an optical functioning are also possible.

Drive Unit of the Traversing Means

In order to guarantee a reliable drive of the traversing means, these are expediently equipped with wheels, so that a corresponding force/moment transmission on a rail can be performed.

Expediently, at least two pairs of wheels (i.e. in a front region and a rear region) are provided at the traversing means, with both pairs of wheels advantageously being designed to be driven so as to be able to realize a reliable drive performance even with heavy loads.

Advantageously, the rail is provided with a substantially plane surface on which the drive wheels can roll. It is, however, also possible to design the rails as gear rods, so that appropriate gearwheels are used for driving.

Furthermore, it is possible to perform the driving of the traversing means via appropriate conveyor belts. If the drive unit is, for instance, integrated in a rack unit and the traversing means is driven via appropriate drive belts or bands, the loading weight to be accelerated or decelerated, respectively, can be reduced by the mass of the drive unit.

The traversing means according to the invention is driven by at least one electric motor that transfers, via appropriate gear rods, the driving torque to at least two driving wheels and thus accelerates or decelerates the traversing means. Advantageously, at least one side of the traversing means according to the invention is guided over an appropriate rail guiding, so that track fidelity within a certain tolerance is guaranteed over the entire length of the rail.

Cable Coils at the Traversing Means

For rising and lowering of the load receiving means, four coils are expediently provided on which the dimensionally instable connecting element is wound up. In order to always guarantee an orientation of the load receiving means that is desired in correspondence with the control, at least two cable coils are driven synchronously; expediently, the two rear and front cable coils each are synchronized. It is, however, also possible to only position two coils at the traversing means, for instance, to reduce the weight or to avoid means for synchronizing the cable coils.

Inertia Brake

The load receiving means is fixed to the traversing means at four dimensionally instable connecting elements, preferably steel cables, and the respective length of extension can be determined by cable length transmitters that are integrated in the respective cable coils as well as by an appropriate goniometry device. To avoid, however, damage of the individual mechanical elements in the load receiving means by an undesired collision of the load receiving means with the traversing means, an appropriate device is provided at the load receiving means and at the traversing means, said device effecting a reliable deceleration and stopping of the cable coils.

This inertia brake consists of two components, a first component positioned at the traversing means and a second component provided at the load receiving means.

The first component advantageously consists of a truncated conical recess and a switching device positioned thereabove in the center, said switching device being directly connected to the current supply of the electrically driven cable coils. The second component has a truncated conical body that is positioned, supported by a spring, on a bolt and rests substantially with positive fit in the truncated conical recess after having been inserted therein.

In another preferred embodiment of the inertia brake according to the invention, a sleeve-like device incorporating electrical switching elements is provided at the traversing means, and a mandrel-like device is positioned as a counterpart at the load receiving means, said mandrel-like device successively actuates the corresponding electrical switching elements on penetrating into the sleeve-like device and thus, on arriving at a particular switch, completely stops the drive of the cable coils.

Expediently, these switches may be designed as magnetic switches that are positioned around the periphery of the sleeve-like device and thus successively trigger corresponding contacts on penetration of the mandrel-like device. A program means connected therebehind evaluates these contact signals and successively decelerates the drives of the cable coils, so that these have come to a stop on a complete penetration of the mandrel-like device in the sleeve-like device. A mechanical abutment contact may expediently be provided additionally, said abutment contact abruptly stopping the drives of the cable coils on a complete penetration of the mandrel-like device.

Second Component Load Receiving Means

The load receiving means consists of a plurality of assemblies, the lifting device, the device for transversal moving, and the arresting means.

Lifting Device

To realize the required lifting motion, the load receiving means comprises a lifting device in accordance with the invention. In order to be able to reliably and safely place the load on the load receiving means, possibly a rack store unit, and on any transfer place, it is necessary to lift or lower, respectively, the load appropriately.

As a technical prerequisite for a reliable and safe lifting and lowering of a load it has to be ensured that both the load receiving, i.e. the lifting of the load, is effected with a slowly increasing lifting force, and the lowering of the load is also performed without any jerks, i.e. with a continuous decreasing of the lifting force, so that also sensitive loads such as pallets with glasses or sensitive electronic devices will not be damaged by possible impacts during lowering or lifting.

When providing a lifting device it is, due to the restricted space capacity on the load receiving device, necessary to realize the lifting device with as small dimensions as possible and to keep the weight low so as to maximally exhaust the loading capacity of the load receiving means.

In accordance with the invention, the lifting device is realized by an eccentric disc that is driven via a shaft.

Expediently, a load carrying platform is formed at the load receiving means, said load carrying platform being, at its bottom, mounted on eccentric discs and comprising a lateral guidance, preferably via appropriate pins running in oblong holes or through prisms sliding in appropriate angular recesses.

By an appropriate contour design of the eccentric discs it is possible to optimally adapt the respective lowering and lifting velocity since the course of motions can be influenced by the shaping of the eccentric disc.

A plurality of such eccentric discs is expediently arranged below the load carrying platform, so that the load is distributed substantially regularly to the corresponding eccentric disc.

In another embodiment of the lifting device according to the invention it is possible to use, instead of the eccentric discs, so-called cams or camshafts that similarly lift or lower the load, respectively.

In a further embodiment of the lifting device according to the invention, the lifting or the lowering may be effected via an appropriate hydraulic or pneumatic device. Here, it must always be taken care that smooth lifting and lowering is performed via appropriate balancing means.

In particular with hydraulically or pneumatically operated lifting devices there is the danger that loads with an eccentric center of gravity charge the individual lifting devices with different strength and that smooth lifting or lowering will thus not be possible.

In a further embodiment of the lifting device according to the invention, a lifting or lowering motion can be performed via a gear rod with an appropriate pinion, or a plurality of gear rods and appropriate pinions. A smooth lifting or lowering motion also has to be taken care of here so as to avoid especially a canting of the gear rods with the pinions.

In a further embodiment of the lifting device according to the invention, spindles, preferably four spindles, are arranged below the load carrying platform, and the rotation of the individual spindles relative to one another is adjusted via a coupling means, so that a smooth lifting or lowering motion can be guaranteed.

Device for Transversal Movement

In order to store or transfer the load positioned on the load receiving means in/from the corresponding store units, i.e. to transport load from a place positioned laterally next to the load receiving means onto the load receiving means, it is necessary to integrate a device for transversal movement in the load receiving means.

In accordance with the invention, a horizontally shiftable platform is arranged on the load receiving means, on which push elements that are engaging each other like a telescope are designed such that small dimensions exist in the state of rest, on the one hand, and that both sides of the load receiving means can be equally fed in the load-receiving state, on the other hand. The static loading of the push elements will have to be introduced in the load receiving means such that a reliable and safe operation can be ensured even when the transversal shifting means has been extended to its maximum.

Advantageously, the transversal shifting means is constructed of a multiplicity of individual elements adapted to be telescoped and operatively interconnected via drive elements, wherein these drive elements can expediently be cables, tie rods, or other dimensionally instable drive elements.

In another preferred embodiment of the transversal shifting device according to the invention, the drive of the individual elements is performed via gear rods and appropriate pinions, with the gear rods being provided as movable elements and being driven via appropriate pinions.

Advantageously, a lateral distance is to be bridged by the transversal shifting means which corresponds at least to the breadth of the load receiving means according to the invention, advantageously even exceeds this dimension.

Arresting Means

After having arrived at a target place in a store rack unit or a corresponding transfer/store unit, the load receiving means according to the invention is connected with both directly adjacent store rack units via an appropriate mechanical arresting means such that a transfer or storing of loads, in particular heavy loads, becomes possible. The load receiving means will have to be connected with the respective store rack units such that also dynamic forces, although unintentionally, for instance an oscillating of the load due to immovable parts, can always be absorbed since the arresting means according to the invention reliably fixes the load receiving means to the rack units during transfer and storage.

Advantageously, the respective arresting means consist of two complementary components, a first component provided at the store rack units as receiving means, and a second component being arranged at the load receiving means.

In accordance with the invention, the load receiving means is fixed with at least two, preferably four arresting means, wherein the arresting means are advantageously pushed into appropriate receiving units that are designed like claws, and remain there. The spreading of the arresting means is expediently performed via suitable devices such as gear rods and pinions, pneumatic/hydraulic means, or swiveling devices adapted to perform an appropriate locking. The following technical side conditions have to be met with the design of the arresting means:

radial centering assistance;
axial centering assistance;
vertical degree of freedom;
vertical assumption of force.

In accordance with the invention, four arresting means are provided at the load receiving means, each of which has a maximum distance to the others and which are designed to be synchronously lockable in pairs so as to avoid a canting of the load receiving means between the store rack units.

BRIEF DESCRIPTION OF THE DRAWING

A preferred embodiment of the system according to the invention will be explained in more detail in the following by means of drawings. The drawings show:

FIG. 6b a top view of the lifting device;

FIG. 7 a schematic side view of the device for transversal movement in accordance with the invention;

FIG. 8a a side of the arresting means;

FIG. 8b a top view of the arresting means;

DETAILED DESCRIPTION OF THE INVENTION

Figure 1:
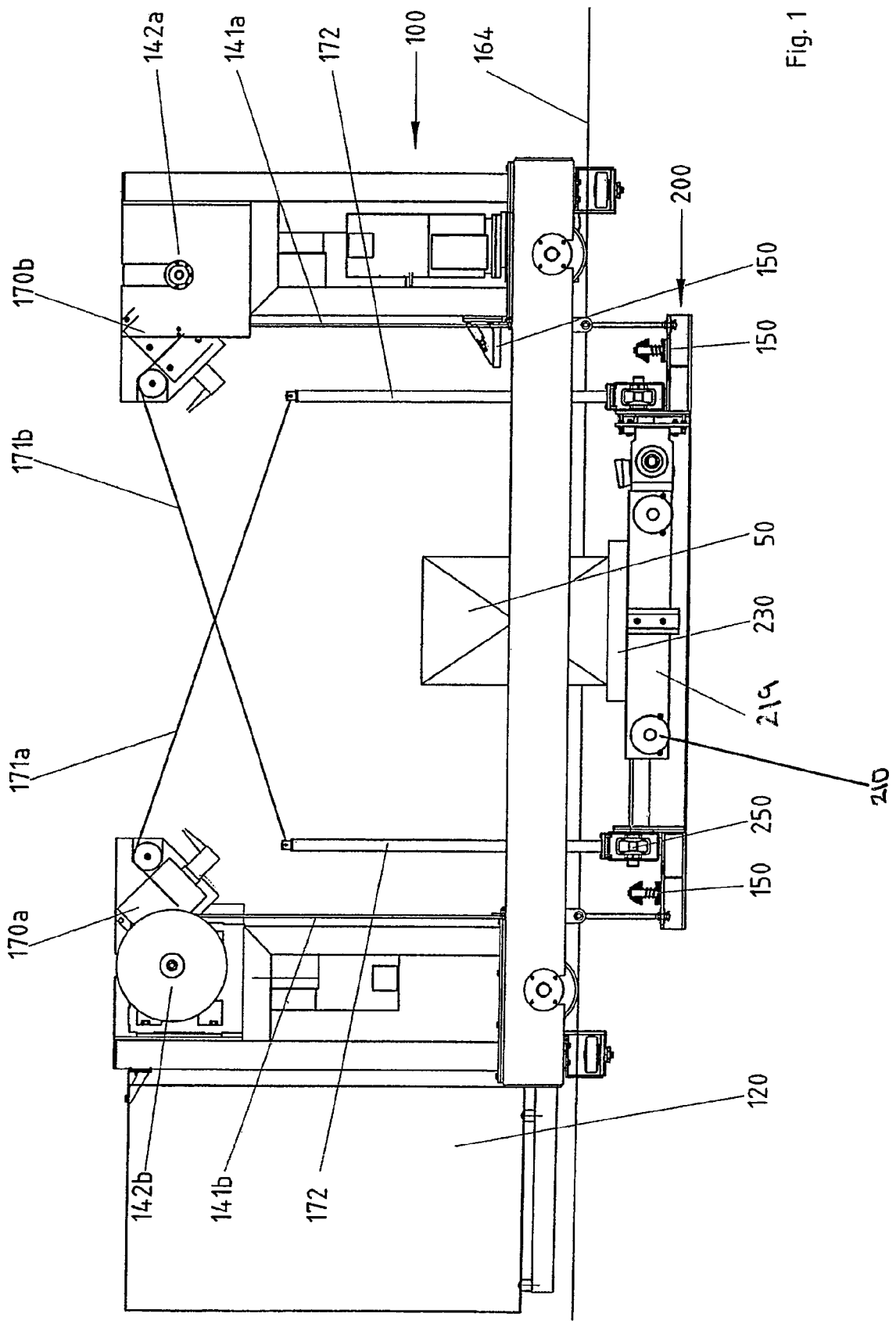
FIG. 1 a schematic side view of the rack feeding device according to the invention.

The rack feeding device 1 according to the invention shows, in accordance with FIG. 1, the traversing means 100 with the load receiving means 200 hanging underneath on cables 141a, 141b. The traversing means 100 with the schematically represented control unit 120 is mounted to be movable on rails 164, with the rails 164 being arranged in the respective rack units (not illustrated) at different levels.

In addition to the steel cables 141a to 141d (141a and 141b are illustrated) there exists a connection between the traversing unit 100 and the load receiving means 200 via the goniometry system 170a, 170b, which is effected by means of dimensionally instable connecting means 171a, 171b.

In order to obtain a certain clearance for the transport of the load 50, stationary rod-like devices 172 are positioned on the load receiving means 200, to which the dimensionally instable connecting elements 171a, 171b are inseparably fastened.

In the state of the traversing means 100 and of the load receiving means 200 illustrated in FIG. 1, the load receiving means 200 is positioned at a distance below the traversing means 100, so that the inertia brake 150 does not have any effect. When the cable coils 142a, 142b are actuated and wind up the cable 141a and 141b further than in the state shown, the inertia brake 150 is activated, and on obtaining a certain distance between the load receiving means 200 and the traversing means 100, the drive of the cable coils 142a, 142b will be stopped.

Figure 2:
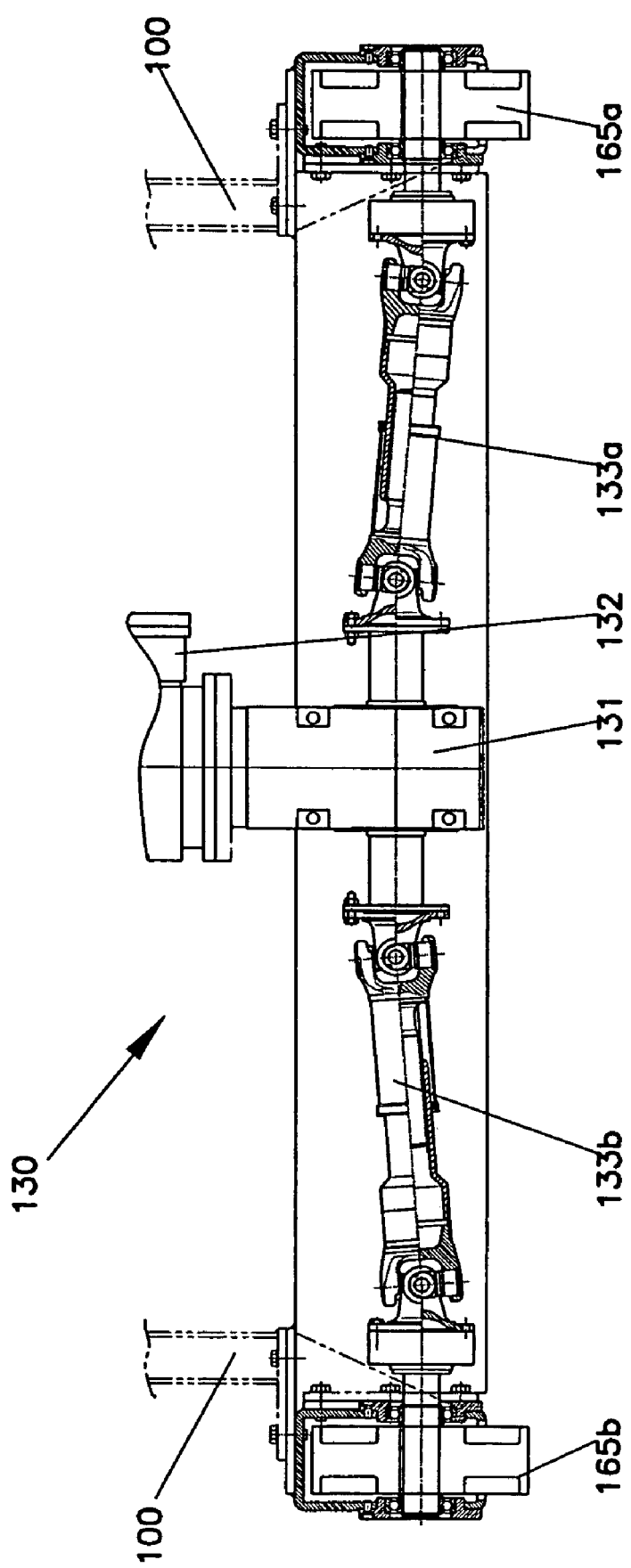
FIG. 2 a schematic sectional view through the drive unit of the traversing means.
Figure 3:
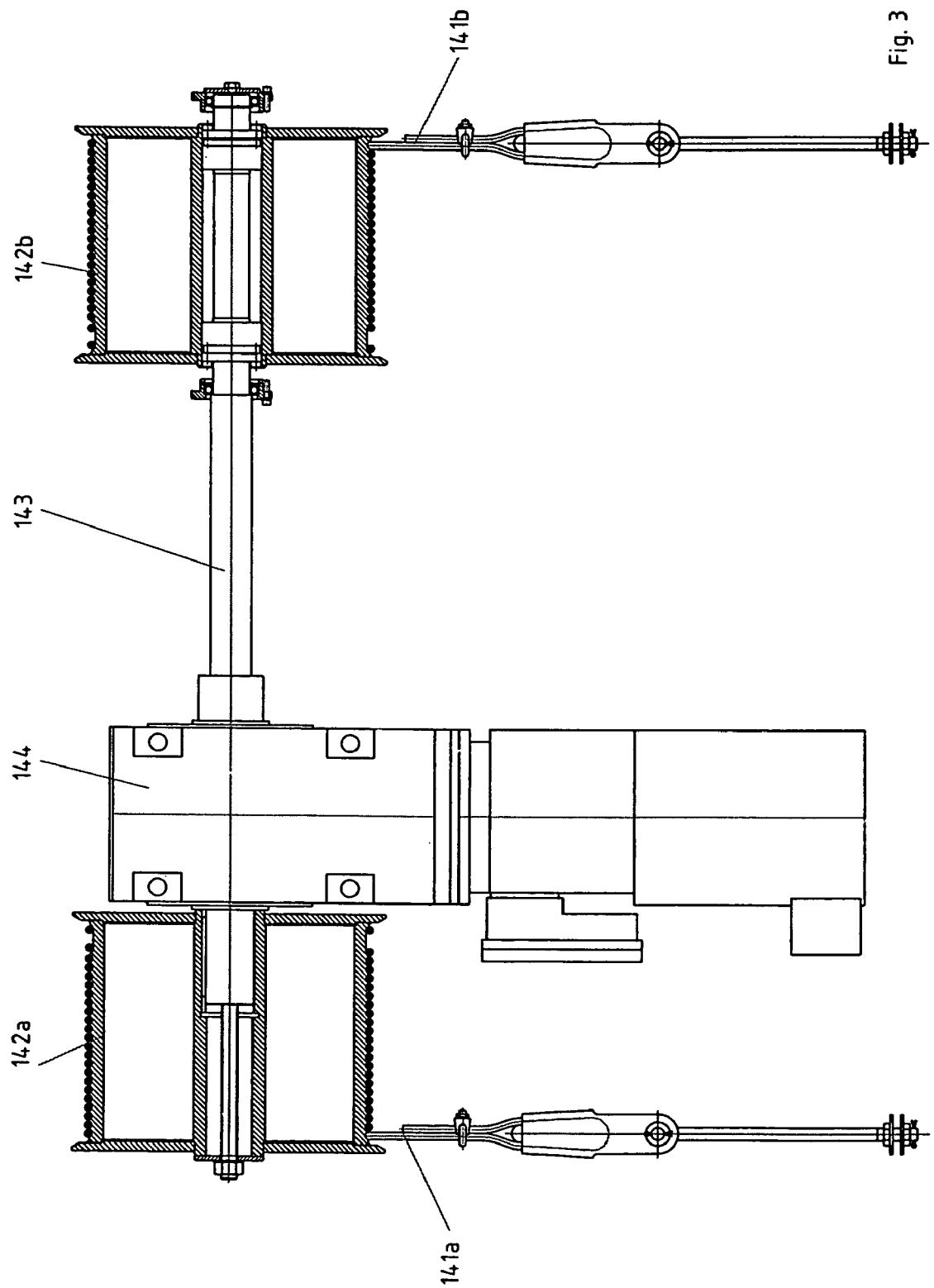
FIG. 3 a schematic sectional view of the cable coils on the traversing means.

FIG. 2 shows a schematic sectional representation of a drive unit of the traversing means 100. The electric drive 132 that is illustrated in part is connected to a transmission 131, and the drive moment is transferred from the transmission 131 to the drive wheels 165a, 165b by means of gear rods 133a, 133b.

The gear rods 133a, 133b are advantageously designed as cardan rods and are thus adapted to offset certain differences in level between the rails 164 and the drive wheels 165a, 165b arranged thereon.

For lifting and lowering the load receiving means 200, at least two pairs of cable coils 142a, 142b (142c, 142d are not illustrated) are arranged on the traversing means 100, on which four cables 141a, 141b, 141c, and 141d are wound up. The cables 141a, 141b, 141c, and 141d are expediently connected inseparably with the load receiving means 200, and the cable coils 142a, 142b are synchronized with one another via a drive 144, and the cable coils 142c, 142d are also synchronized with one another via an appropriate drive (not illustrated).

Figure 4:
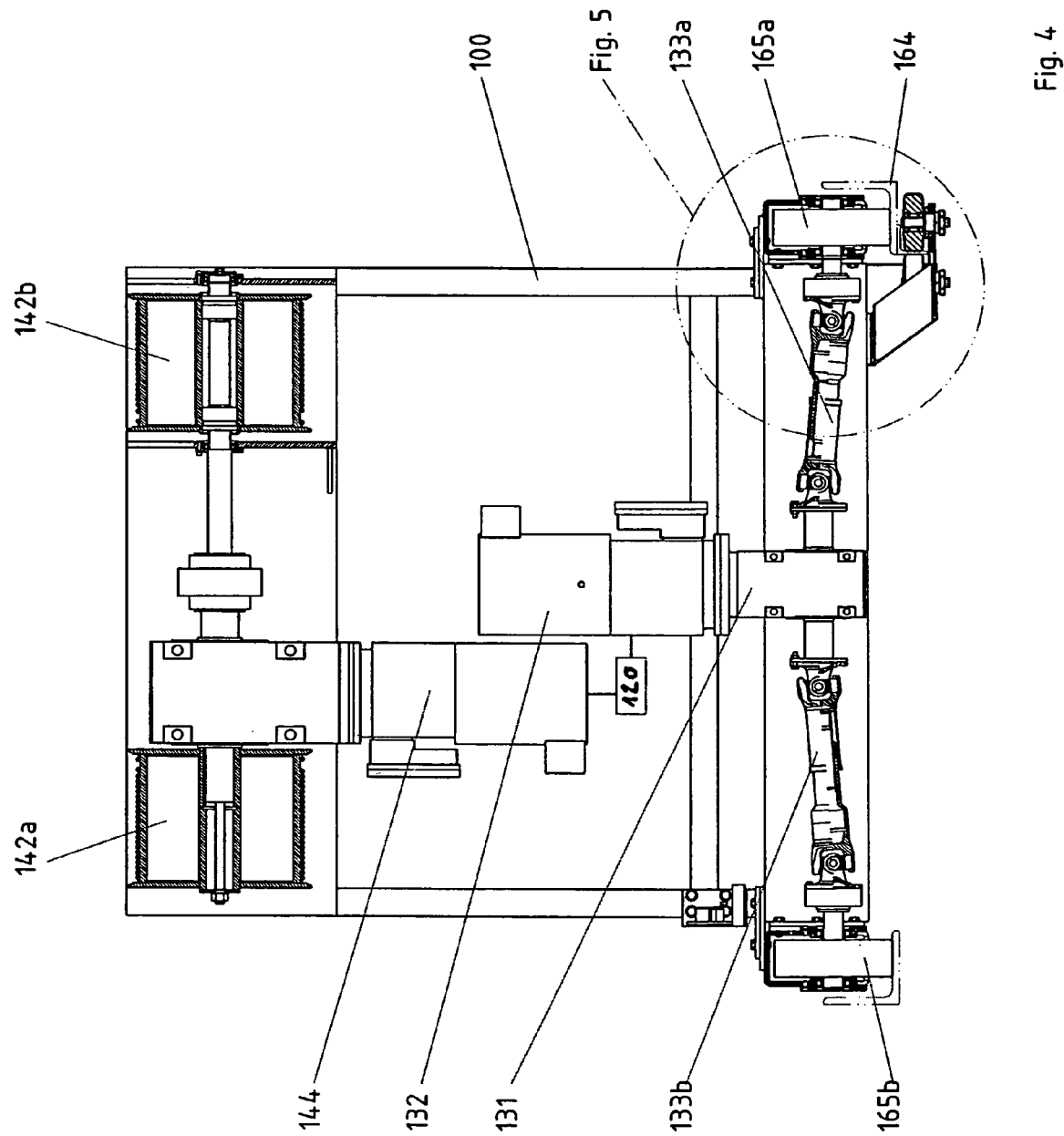
FIG. 4 a schematic sectional view through the traversing means with cable coils and drive unit.

The respective cable coil drives are, like the drive of the traversing means 132, controlled by the control unit 120. In the sectional representation according to FIG. 4, the arrangement of the drive unit 130 with the respective components (drive unit 132, transmission 131, gear rods 133a, 133b), and the cable coils 142a, 142b and their drive 144 are illustrated together with the control unit 120.

Figure 5:
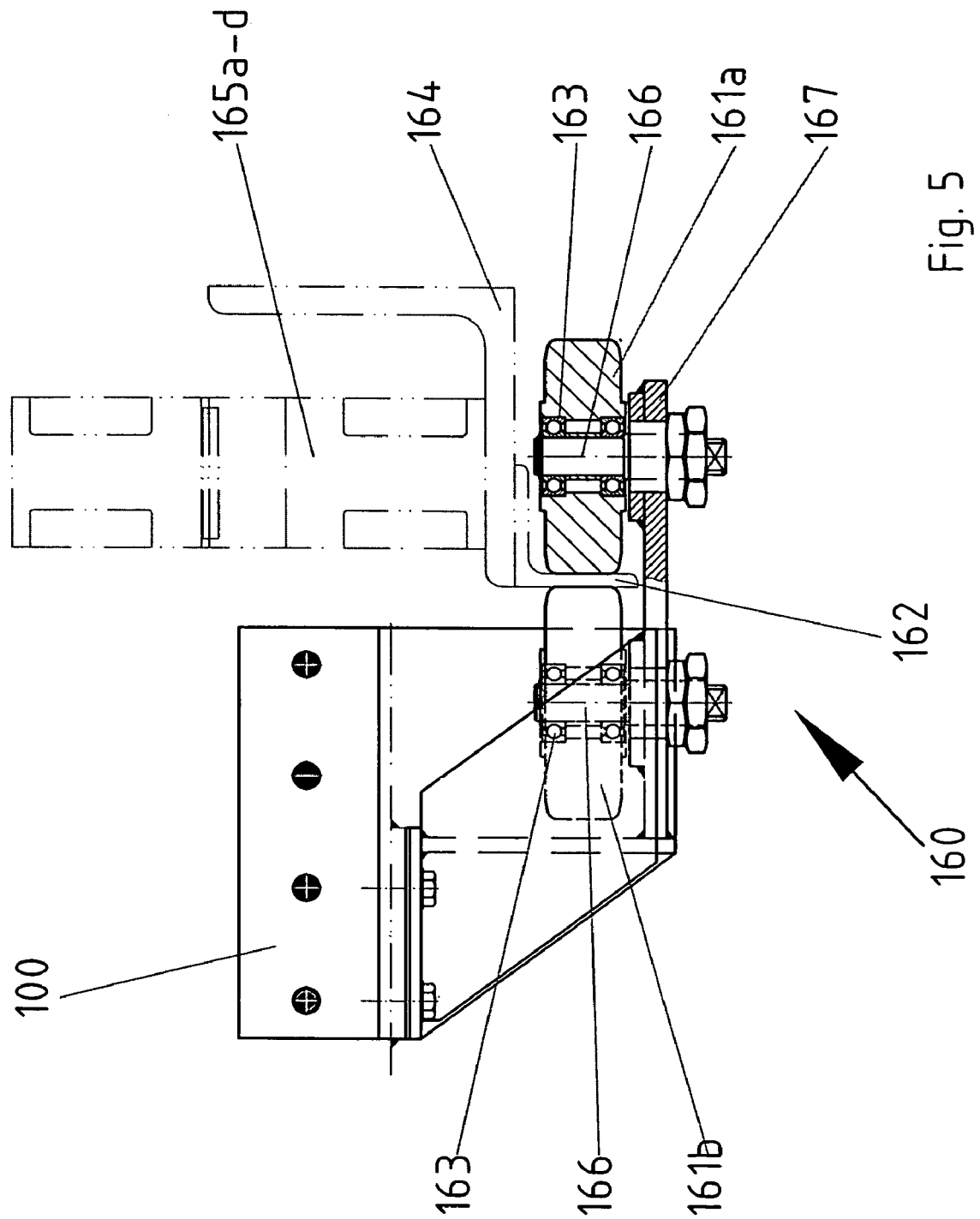
FIG. 5 a sectional view through the lateral guidance of the traversing means.

In the detailed view according to FIG. 5, the lateral guidance of the traversing unit 100 is shown, which is arranged in the front and rear region of the traversing means 100. For lateral guidance, the rail arrangement 164 comprises a rail bead 162 leading vertically downwards, at which two guide wheels 161a, 161b adhere to. These guide wheels 161a, 161b are mounted on bolts 166 via appropriate roller bearings 163, which are connected via a fastener sheet 167 to the traversing means 100. By the lateral guidance of the traversing means it is prevented that the drive wheels 165a, 165b, 165c, 165d leave the rails 164 or collide with individual rack units.

The lifting device 210 integrated in the load receiving means 200 comprises four eccentric discs 211a, 211b, 211c, and 211d that are arranged in pairs on shafts 216, 217. For driving the shafts 216, 217, they each comprise pinions 213a, 213b that are connected with one another by means of drive chain 214 and are jointly driven by the drive unit 212 via an appropriate drive chain 215.

When the drive unit 212 is set in motion, it drives the drive chain 215, so that the shaft 17 is directly set in rotation and simultaneously sets the shaft 216 in rotation via the drive chain 214. Both rotational motions of the shafts 216 and 217 are synchronized by the arrangement illustrated in FIG. 6, so that the rotational motions of the eccentric discs 211a, 211b, 211c, 211d are also taking place synchronously.

Figure 6A:
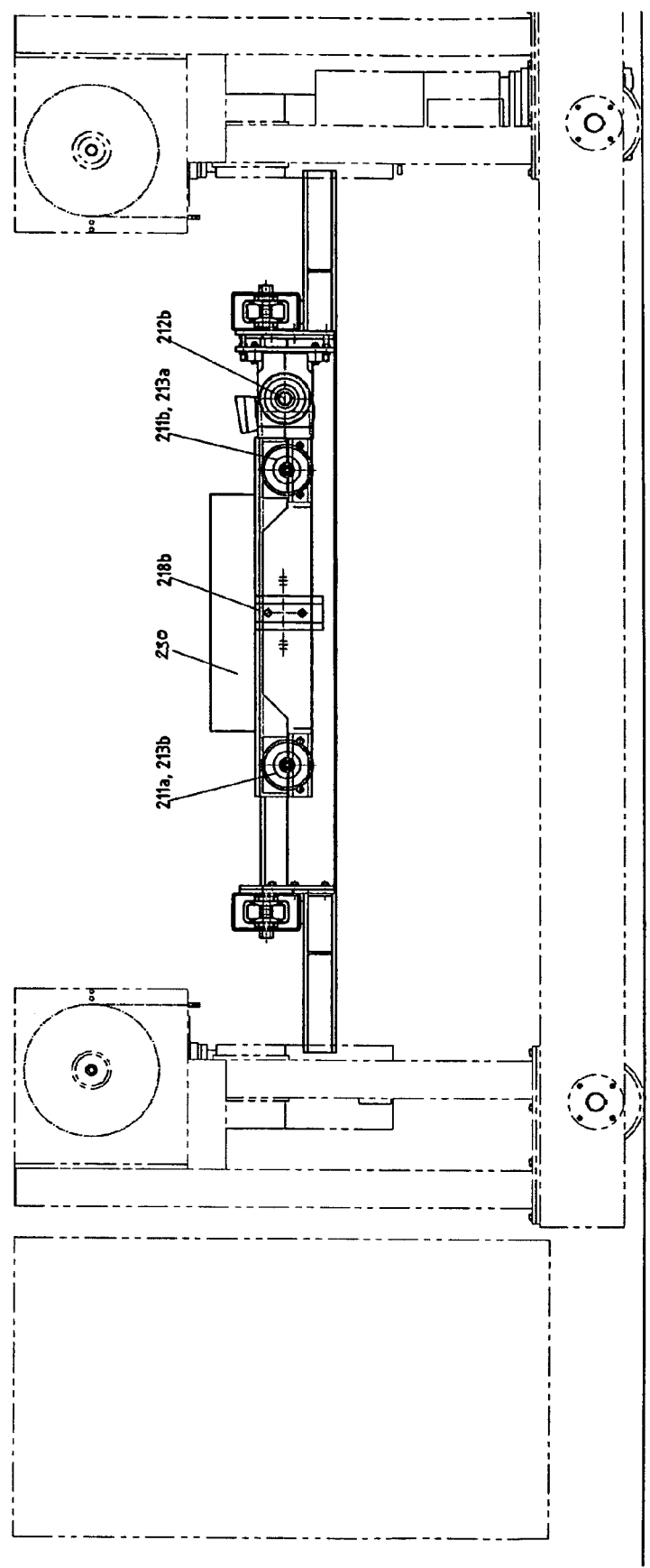
FIG. 6a a sectional representation of the lifting device.

In order to ensure a lateral guidance of the load carrying platform 219, appropriate guiding elbows 218a, 218b are provided at the two opposite sides of the load carrying platform 219. Expediently, a rail element of trapezoid design, which is arranged at the load carrying platform 219, runs over guidance rolls 220a, 220b, 220c, 220d that are illustrated in FIG. 6 and are positioned on the frame of the load receiving means 200, so that merely a degree of freedom in the vertical direction exists for the movement of the load carrying platform 219.

In the device for transversal movement 230 illustrated schematically in FIG. 7, the individual elements 231, 232, and 233 are, for reasons of clarity, represented on different levels and not—as technically realized—on one level.

The three individual elements 231, 232, 233 each are connected with one another via dimensionally instable connecting elements 234 and 235. The lowermost level illustrated in FIG. 7, which is designated as individual element 231, is arranged on the load carrying platform 219 and rigidly connected therewith.

The individual element 232 is positioned inside the individual element 231 and is connected therewith via the connecting element 234. The individual element 233 is positioned inside the individual element 232 and is connected therewith via the connecting element 235.

The connecting element 235 consists of two branches, each of which is connected to the individual element 231 and the individual element 233, and is deflected via direction changing elements 236 that are arranged at the individual element 232. The connecting element 234 that is designed as drive element consists of one branch only and connects the individual elements 232 and 231 with one another. The connecting element 235 is also deflected via appropriate direction changing elements 237 that are arranged at the respective end of the individual element 231.

On rotation of the drive element 238 in the direction indicated by the arrow, the connecting element 234 is deflected via the direction changing element 237 also in the direction of the arrow and exerts a force on the individual element 232, so that this also starts to move in the direction of the arrow.

By the movement of the individual element 232 in the direction of the arrow, the connecting element 235 is also conveyed by the direction changing elements 236, so that the individual element 233 also starts to move in the direction of the arrow. As soon as the drive 238 stops, the respective transversal movement of the individual elements 232 and 233 is also stopped, and the individual elements 232, 233 start to move in the opposite direction when the direction of rotation of the drive 238 is reversed. Expediently, the connecting elements 234, 235 are designed as a chain.

The arresting means 250 according to FIG. 8 shows two elements 251a, 251b that are designed in the form of arbors, comprising at their one end a gear rod profile each and at their other end arresting elements 253a, 253b, 254 adapted to engage in corresponding arresting means receiving means 255 positioned at the rack units 2.

In accordance with FIG. 8, the arresting means are formed of two pyramid-truncated bodies 253a, 253b each, the tapered faces of which are connected with one another via a cylindrical body 254. The surface shells of the pyramid-truncated bodies 253a, 253b serve as a centering assistance for the corresponding arresting means receiving elements 255. On actuation of the drive 252, the arbor-like elements 251a, 251b perform an opposite movement and spread the arresting means 253a, 253b, 254 into the arresting means receiving elements 255, so that the load receiving means 200 is positively connected with the thus adjacent rack units 2 (not illustrated).

In order to be able to detect the time of arresting, the drive 252 is, for instance, equipped with an appropriate momentum sensor, or sensors report a corresponding touching contact between the arresting means receiving elements and the cylindrical body, so that the drive 252 receives a corresponding signal and stops a further spreading of the arbors 251a and 251b.

Figure 9B:
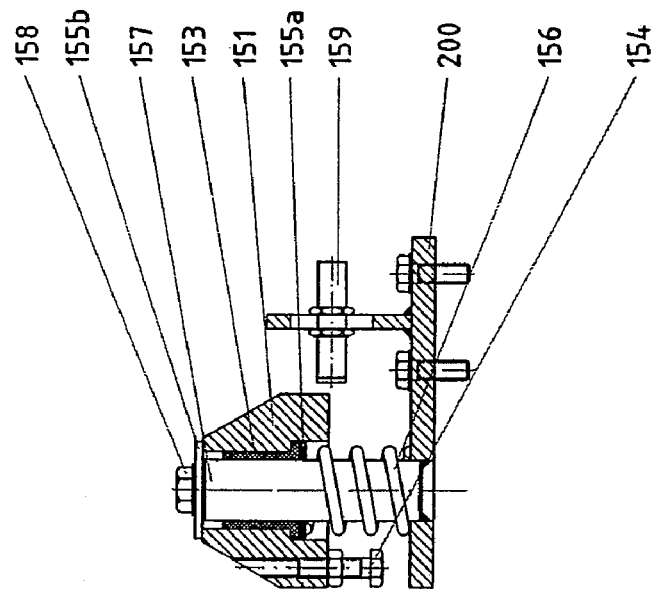
FIG. 9b a sectional representation of the inertia brake.
Figure 9A:
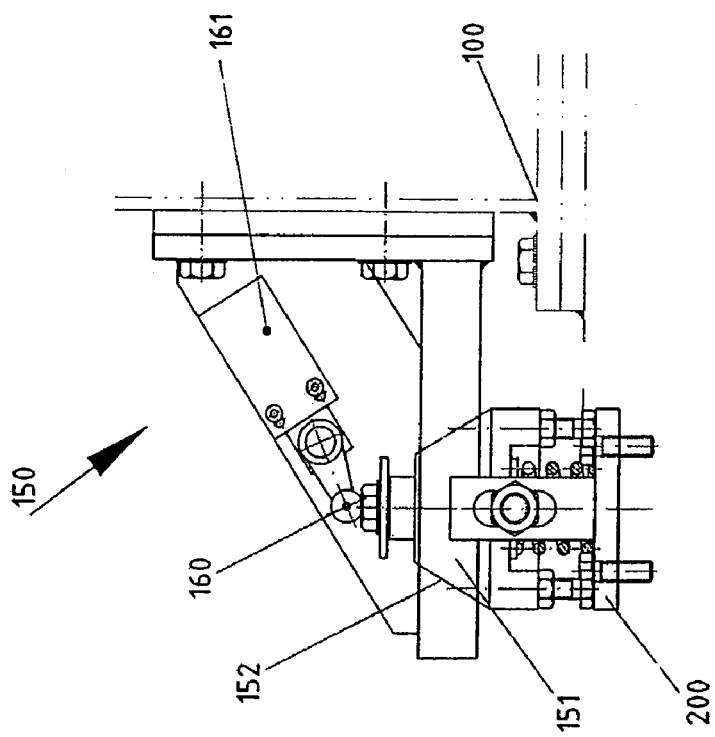
FIG. 9a a schematic side view of the inertia brake.

FIG. 9 illustrates the inertia brake 150 according to the invention, which prevents a collision of the load receiving means 200 with the traversing means 100. To this end, a bolt 157 is positioned at a suitable position on the load receiving means 200, said bolt being preferably welded to the load receiving means 200.

A truncated conical body 151 is slidingly arranged at the bolt 157, with a support of the truncated conical body 151 being performed via a coil spring 156, and the movability of the truncated conical body 151 being ensured via a sliding bushing 153 and a disc 155a positioned directly thereto.

In order to prevent loosening of the truncated conical body 151 from the bolt 157, the truncated conical body 151 is secured with a disc 155b and a corresponding nut 158. A sensor 159 is positioned adjacent to the truncated conical body 151, said sensor being aligned and designed such that a vertical movement of the truncated conical body 151 triggers a corresponding signal that is processed in the control unit.

A truncated conical recess 152 is formed at the traversing unit 100, the contour of which is the complementary of the truncated conical body 151. In the case of a corresponding vertical movement of the load receiving means 200, the truncated conical body 151 immerses, on achieving a certain distance between the load receiving means 200 and the traversing means 100, in the truncated conical recess 152 and snuggles thereagainst with positive fit.

By the sliding bearing of the truncated conical body 151 on the bolt 157, there is effected, on continuation of the vertical movement of the load receiving means 200, a shifting movement on the bolt 157, opposite to the spring force of the coil spring 156, so that the truncated conical body 151 performs a relative movement vis-à-vis the sensor 159. The signal produced by this movement of the truncated conical body is processed in the control unit 120 and results in a stopping of the cable coil drives 144.

In order to nevertheless effect a reliable stopping of the cable coil drives 144 on failure of the sensor 159, a switching element 161 is furthermore provided, said switching element 161 being arranged at the traversing means 100 such that, on a further vertical movement of the load receiving means 100, the nut 158 that is positioned on the bolt 157 abuts on a switching arm 160 and abruptly interrupts the electrical supply of the coil drives.

Figure 10A:
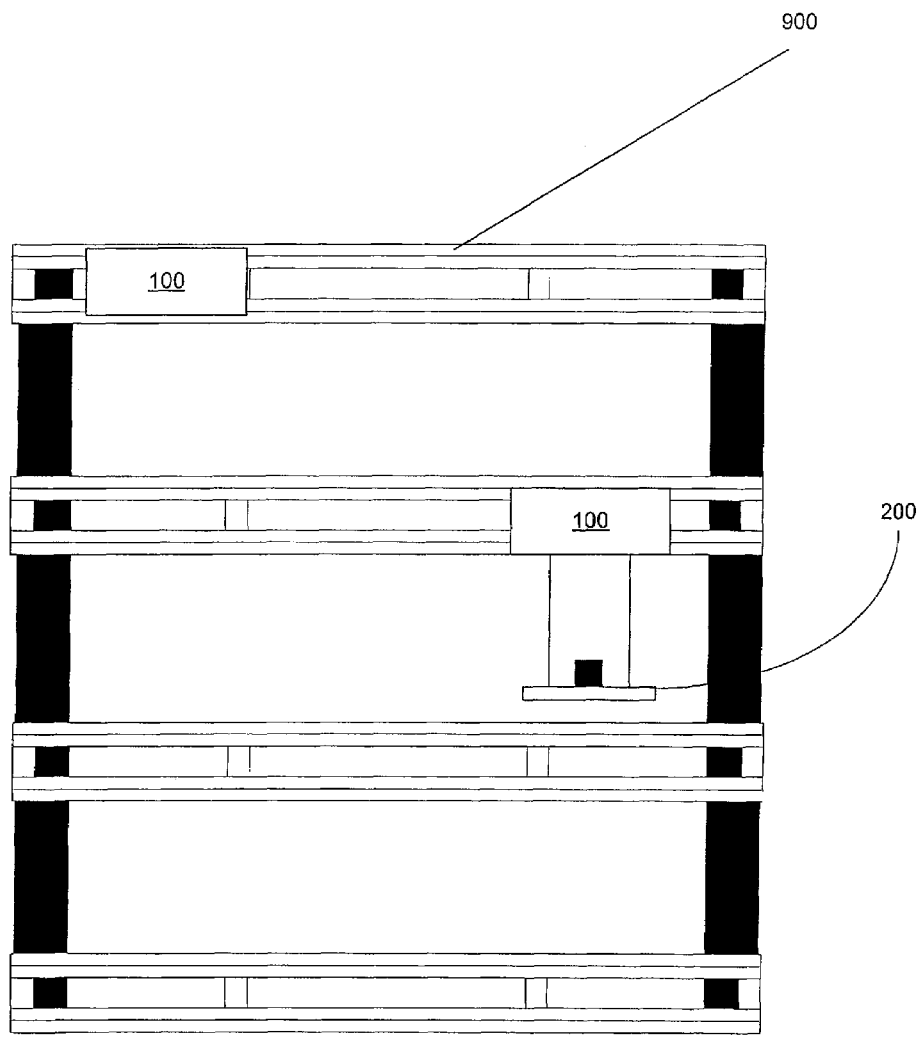
FIG. 10a a schematic side view of the rack and the rack feeding devices on a single rack with the other racks removed for clarity.
Figure 10B:
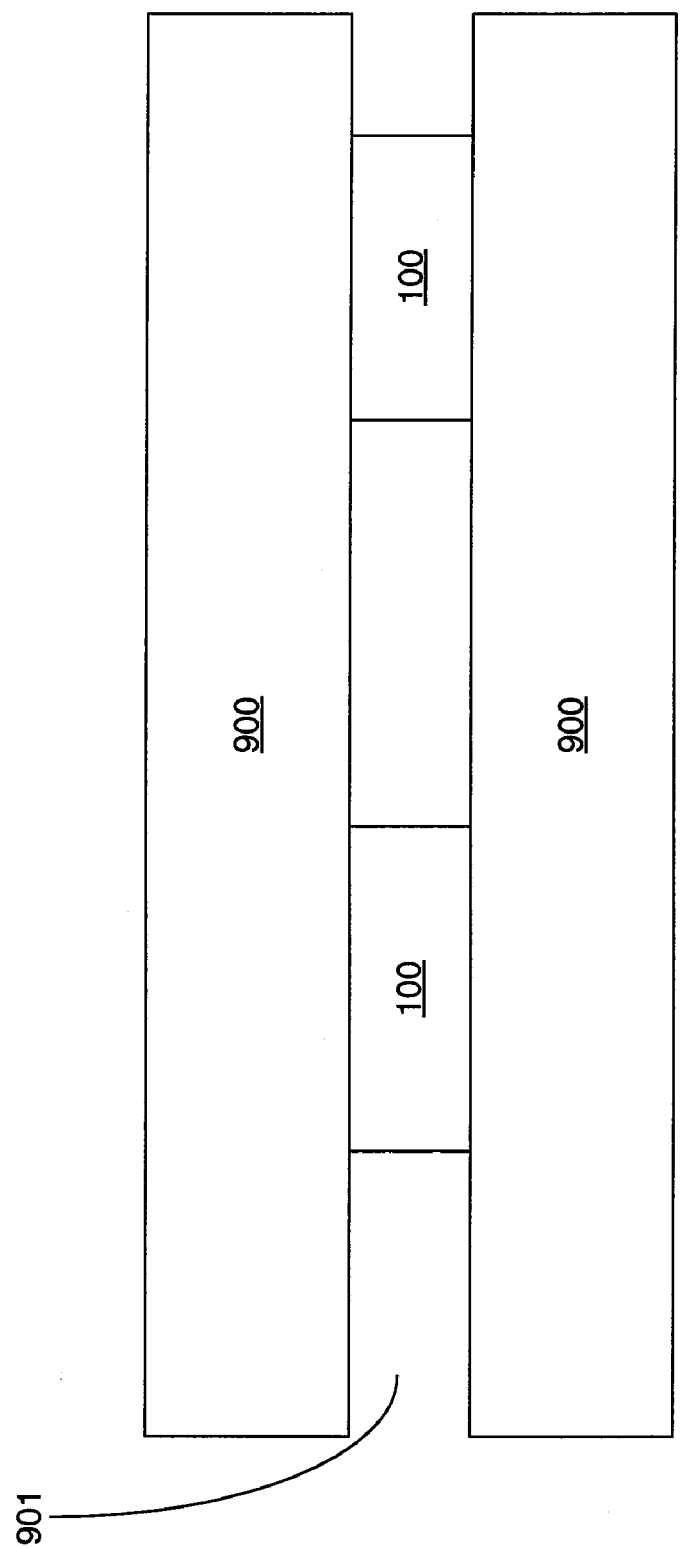
FIG. 10b a schematic top view of the rack and the rack feeding system.

FIG. 10a shows a schematic side view of the rack 900 and the rack feeding system. FIG. 10b shows a top view of the rack, the rack feeding system and alley 901.

The invention claimed is:

1. A system for feeding store units, comprising:
   a plurality of rack units that are designed and arranged in a room such that at least one alley is formed,
   at least one rack feeding device which includes
      a first traversing means adapted to be moved on rails in the longitudinal direction of the alley;
      a control unit for controlling the movement of the traversing means;
      means for determining the position of the traversing means in the alley;
      a load receiving means hanging on cables beneath the traversing means wherein the load receiving means includes a load carrying platform and a lifting device for lifting and lowering the load carrying platform relative to the load receiving means while maintaining the load carrying platform in a substantially horizontal orientation;
      wherein said lifting device includes rotation means positioned at a lower portion of the load carrying platform such that a uniform load distribution is imparted to the lifting device by a load carried on the load carrying platform;
      means for determining the position of the load receiving means relative to the traversing means;
      means for mechanical connection of the load receiving means with a rack unit of the plurality of rack units;
      wherein the means for mechanical connection with the rack unit comprises an electric drive with a pinion that drives a gear rod, and wherein the gear rod is arranged and designed such that it extends laterally out of the load receiving means on rotation of the pinion, and wherein the gear rod comprises means at an end of the gear rod for projecting over the load receiving means and engaging with corresponding receiving devices at the rack units; and
      further wherein the means at the end of the gear rod substantially consists of two truncated conical bodies, the tapered end faces of which are connected with one another via a cylindrical body.

2. The system according to claim 1, wherein the control unit of the traversing means comprises: at least one processor and one memory, and wherein a data processing program is stored in the memory, which calculates, by using at least one of the position or the velocity data of either the traversing means or of the load receiving means, a traversing path from a first place to a second place in the alley.

3. The system according to claim 2, wherein the control unit of the first traversing means is in contact with a control unit of at least a second traversing means, and wherein data of motion of the first and at least the second traversing means are exchanged between the control units.

4. The system according to claim 1, wherein a device for transversal movement of the load is provided on the lifting device.

5. The system according to claim 4, wherein the device for transversal movement comprises telescoping push elements that are adapted to be horizontally extended via a mechanical drive.

6. The system according to claim 5, wherein the push elements engage with one another and support one another in the extended state.

7. The system according to claim 6, wherein the push elements are equally extendable on both sides of the load receiving means.

8. The system according to claim 1, wherein the system includes a connection between the traversing means and the load receiving means, said connection including a first cable extending from a first side of the traversing means to an upstanding rod positioned on a side of the load receiving means which is opposite the first side of the traversing means, a second cable extending from a second side of the traversing means to a second upstanding rod positioned on a second side of the load receiving means which is opposite the second side of the traversing means wherein the cables cross above the load receiving means.

9. The system according to claim 1, wherein the traversing means includes a guidance system including a plurality of guide wheels mounted so that the rotational axis of the guide wheels is perpendicular to the direction of movement of the traversing means and further wherein the guide wheels sandwich a portion of at least one of the rails.

10. The system of claim 1, wherein the rotation means of the lifting device includes at least one of: an eccentric disk driven by a shaft, cams and cam-shafts, gear rod and pinions od spindles.

11. A system as claimed in claim 1, wherein the store units are high rack stores.

12. A system for feeding store units, comprising:
- a plurality of rack units that are designed and arranged in a room such that at least one alley is formed;
- at least one rack feeding device including
  - a traversing unit adapted to be moved on rails in a longitudinal direction of the alley,
  - a control unit for controlling the movement of the traversing unit,
  - a path measuring device for determining the position of the traversing unit,
  - a load receiving unit suspended by cables beneath the traversing unit,
  - a device for determining the position of the load receiving unit relative to the traversing unit, and
  - an arresting unit for connecting the load receiving unit to rack unit of the plurality of rack units; and
  - a connection unit for connecting with the rack unit wherein the connection unit comprises an electric drive with a pinion that drives a gear rod, and further wherein the gear rod is arranged and designed such that it extends laterally out of the load receiving unit on rotation of the pinion, and wherein the gear rod comprises means at an end of the gear rod for projecting over the load receiving unit and engaging with corresponding receiving devices at the rack units; and
  - further wherein the means at the end of the gear rod substantially consists of two truncated conical bodies, the tapered end faces of which are connected with one another via a cylindrical body.

13. The system of claim 12, wherein the control unit controls the traversing unit so that upon braking the deceleration of the traversing unit is controlled such that the load receiving unit comes to a stop at a target place substantially simultaneously with the traversing unit.

14. A system for feeding store units, comprising:
- a plurality of rack units that are designed and arranged in a room such that at least one alley is formed, wherein each rack unit includes
- a plurality of shelves at different vertical levels,
- a plurality of rails arranged in the respective rack units corresponding to the different vertical levels of the shelves,
- a plurality of rack feeding devices adapted to be moved on the rails in the shelves in the longitudinal direction of the alley, each of which include
  - a traversing means adapted to be moved on the rails in the shelves in the longitudinal direction of the alley;
  - a control unit for controlling the movement of the traversing means;
  - means for determining the position of the traversing means in the alley;
  - a load receiving means hanging on cables beneath the traversing means;
  - means for determining the position of the load receiving means relative to the traversing means;
  - means for mechanical connection of the load receiving means with a rack unit of the plurality of rack units; and
  - wherein the means for mechanical connection with the rack unit comprises an electric drive with a pinion that drives a gear rod, and wherein the gear rod is arranged and designed such that it extends laterally out of the load receiving means on rotation of the pinion, and wherein the gear rod comprises means at an end of the gear rod for projecting over the load receiving means and engaging with corresponding receiving devices at the rack units; and
- further wherein the means at the end of the gear rod substantially consists of two truncated conical bodies, the tapered end faces of which are connected with one another via a cylindrical body.

* * * * *